March 30, 1965  A. WIEDERMANN  3,175,517
SUSPENSION
Filed March 13, 1962  2 Sheets-Sheet 1
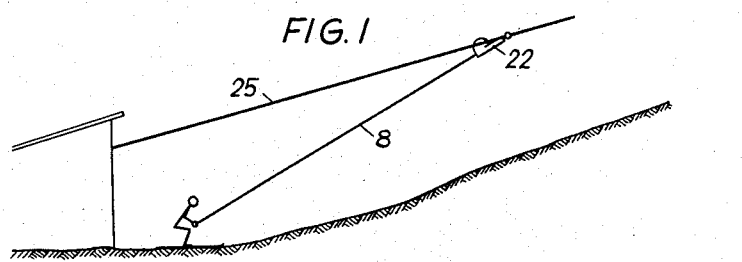
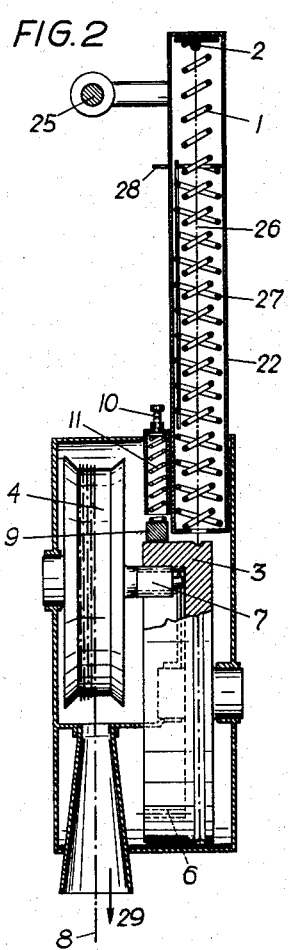
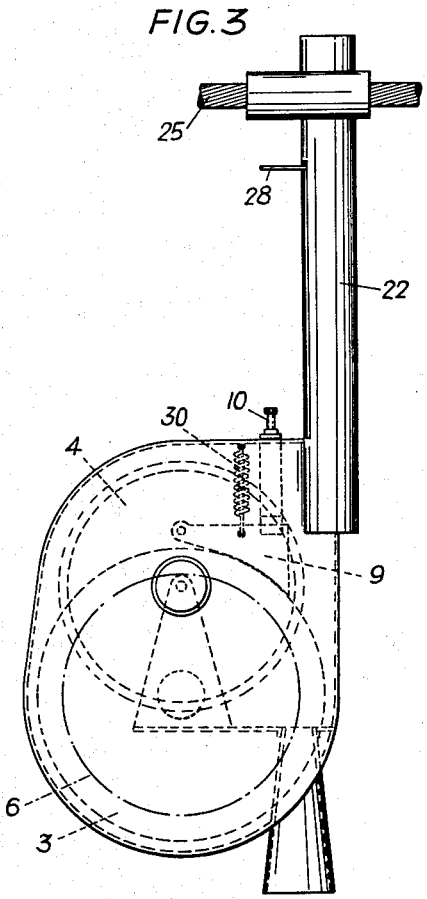
Inventor:
Anton Wiedermann
by:
Michael S. Striker
Attorney

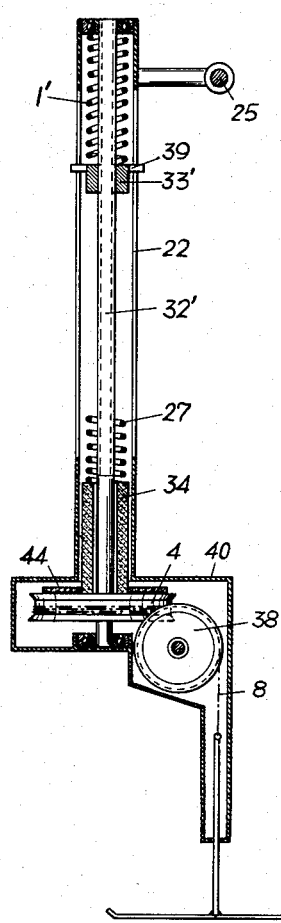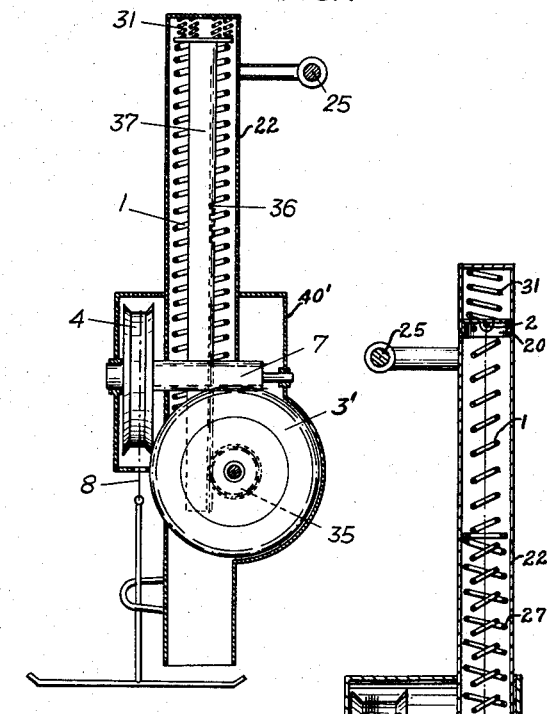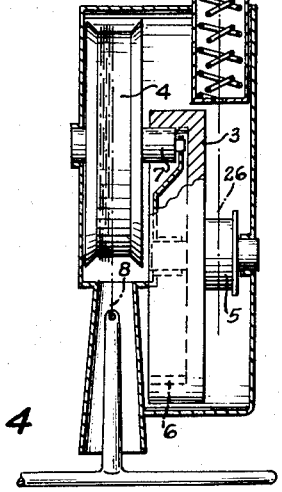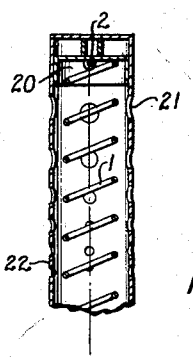

United States Patent Office 3,175,517
Patented Mar. 30, 1965

3,175,517
SUSPENSION
Anton Wiedermann, Bocksteiner Strasse 15, Bad Gastein, Austria
Filed Mar. 13, 1962, Ser. No. 179,417
Claims priority, application Austria, Mar. 23, 1961,
A 2,400/61
7 Claims. (Cl. 104—173)

The present invention relates to a ski tow and more specifically to a suspension arrangement for attaching a towing cable to a traction cable of a ski tow.

Ski tows are known for towing skiers up a hill and such ski tows usually include an endless continuously moving traction cable from which one or a plurality of towing cables are suspended. The endless traction cable is usually wound about two rollers, one of which is located at the top and the other at the bottom of the hill and one of which is continuously driven so that one run of the traction cable moves uphill whereas the other moves downhill, and a skier grabs the free end of one of the towing cables on the uphill run of the traction cable to be towed up the hill.

One object of the present invention is to provide for a suspension arrangement for the attachment of a towing cable to the traction cable by means of which shocks to the skier especially during acceleration of the skier from his standing position to the velocity of the tow are avoided and by means of which the different distances of the traction cable from the slope over which the skier is pulled can be compensated for.

A further object of the present invention is to provide for such a suspension arrangement which is relatively light in weight and which can be manufactured of few and rugged parts which will stand up under extended use.

With these objects in view, the suspension arrangement according to the present invention for attaching a towing cable of a ski tow mainly comprises support means attached to the traction cable, a roller turnably mounted in the support means, a towing cable fixed at one end to the roller and wound in part thereon so that during unwinding of the towing cable from the roller and increase of the free length of the cable, the roller is rotated in one direction, elongated spring means engaging with one end the support means, and step-down gear transmission means operatively connected to the roller and to the other end of the elongated spring means to translate rotation of the roller in said one direction into increasing stressing of the spring means. When the skier grabs the free end of the towing cable, a pull will be exerted thereon and the towing cable will be unwound from the roller while the spring will be increasingly stressed so that the skier is gradually taken along and pulled upwardly along the hill. The step-down gear transmission will assure that a relatively great increase of the free length of the towing cable will result in a relatively small stressing or compression of the spring. When the skier arrives at the top of the hill, he will release the towing cable and the stressed spring will cause rewinding of the towing cable on the roller.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic view illustrating part of a traction cable and a towing cable attached thereto, the free end of which is grabbed by a skier;

FIG. 2 is a sectional view of one embodiment of a suspension arrangement for attaching a towing cable to a traction cable according to the present invention;

FIG. 3 is a side view of the embodiment shown in FIG. 2;

FIG. 4 is a sectional view of a second embodiment of a suspension arrangement according to the present invention;

FIG. 5 is a partial sectional view of a modified portion of the suspension arrangement which may be used either with the embodiment shown in FIG. 2 or FIG. 4;

FIG. 6 is a sectional view of a further modification of the suspension arrangement; and FIG. 7 is a sectional view of an additional modification of the suspension arrangement according to the present invention.

FIG. 1 schematically illustrates part of a ski tow in which a towing cable 25, only partly shown in FIG. 1 is shown for towing skiers uphill on a ski slope. It is understood that towing cable 25 is an endless cable guided at the bottom and at the top of the hill about two rollers, not shown in the drawing, one of which is continuously driven so that one of the runs of the cable moves upwardly whereas the other moves downwardly on the slope spaced from the surface thereof. A plurality of towing cables 8, one of which is shown in FIG. 1, are attached by means of a suspension arrangement 22, schematically indicated in FIG. 1, to the traction cable 25. The skier, schematically indicated in FIG. 1, grabs the free end of the towing cable 8 to be pulled upwardly along the slope.

Referring now to FIGS. 2 and 3 of the drawings, it will be seen that the suspension arrangement 22 includes a housing from which a tube projects upwardly from the remainder of the housing. The tube is attached near the upper end thereof by an arm to the traction cable 25. Turnably mounted in the housing is a roller 4 to which one end of the towing cable 8 is attached and the latter is wound in part on the roller while the free end extends downwardly through a funnel-shaped part of the housing. Coaxially fixed to the roller 4 for rotation therewith is a pinion 7 which meshes with an internal gear ring 6 formed in a second roller 3 mounted in the housing beneath the lower end of the tube. Located in the tube is an elongated spring means 1, shown in FIG. 2 as a compression coil spring, which engages with its lower end a shoulder formed at the bottom end of the tube. An elongated flexible means 26, for instance a cable, is fixed with one end thereof to the roller 3 and extends through the coil spring 1 and is attached at its upper end to a small plate 2 abutting against the upper end of the spring. Located in the tube is a second coil spring 27 which is in expanded position shorter than the coil spring 1 and on top of the spring 27 is a ring which extends with a projection 28 through a slot formed in the tube 22. Tiltably mounted in the housing is additionally a brake shoe 9 adapted to engage the outer surface of the roller 3, but held in inactive position away from the roller 3 by a coil spring 30 fixed at one end to the brake shoe 9 and at the other end to the housing as best shown in FIG. 3. Located in the path of the projection 28 is a plunger 10 slidably mounted in the housing which is adapted, when moved downwardly to act through a spring 11 on the brake shoe 9 to move the same against the force of the spring 30 from its inactive to its active position engaging the outer surface of the roller 3.

The arrangement shown in FIGS. 2 and 3 will act as follows:

When a skier grabs the free end of the towing cable, a pull will be exerted thereon which will unwind the towing cable from the roller 4 rotating thereby the pinion 7 and the second roller 3 to wind the cable 26 on the second roller compressing thereby the spring 1. As the plate 2 is moved downwardly during winding of the cable 26 on the second roller 3, it will engage the ring on the upper end of the second spring 27 so that during further rotation of the second roller 3 and unwinding of the cable 26 thereon, the second spring will likewise be compressed to an increasing extent. Compression of the springs 1 and 27 will produce an increasing resistance against further unwinding of the cable 8 from the roller 4 and the skier will thereby gradually be taken along and be pulled upwardly along the slope. When the springs are compressed to such an extent that the projection 28 engages the plunger 10, the brake shoe will be applied to the outer surface of the roller 3 and thereby any further rotation of the roller 3 and the roller 4 will be stopped and the skier will be pulled along with the speed of the traction cable 25. When the skier reaches the top of the hill, he releases the towing cable and the compressed springs will be expanded again and rewind the towing cable 8 on the roller 4. It will be noted that due to the step-down gear transmission between roller 4 and roller 3, the free length of the towing cable can be expanded to a considerable degree while such expansion will result in a relatively small compression stroke on the spring so that the whole arrangement can be held relatively small.

A slightly different embodiment is shown in FIG. 4 which differs from the embodiment above in that the cable 26 which is connected to the upper end of the coil spring 1 is not wound on the outer surface of the gear ring 3, but a second roller 5 of a diameter considerably smaller than that of the gear ring 3 and also considerably smaller than that of the roller 4 is coaxially fixed to the gear ring 3 for rotation therewith and the cable 26 is wound on this second roller 5 of smaller diameter. This provides for a further step-down transmission between roller 4 and compression spring 1. A further difference between the embodiment shown in FIG. 4 and that shown in FIGS. 2 and 3 is that the cable 26 is attached at its upper end to a piston which is guided in the tube 22. Furthermore, an additional short compresseion spring 31 is located between the piston 20 and the upper closed end of the tube 22. The piston 20 and the additional spring 31 serve as damping means during expansion of the compression spring 1 so that after the towing cable is released, the winding thereof on the roller 4 will proceed slowly and without any jolts.

FIG. 5 shows a modification of this damping arrangement described in connection with FIG. 4 and, as can be seen from FIG. 5, a plurality of apertures 21 are formed in the upper end of the tube 22 through which air during upward movement of the piston 20 can escape. As can be seen from FIG. 5, the apertures 21 are spaced in axial direction of the tube from each other and the cross sections of the apertures increase toward the upper end of the tube 5.

FIG. 6 shows an additional embodiment of a suspension arrangement according to the present invention. In this embodiment a guide roller 38 is turnably mounted in the housing 40 and the towing cable 8 is guided by the guide roller 38 onto the roller 4 to which one end of the towing cable 8 is attached. The roller 4 is turnably mounted in the housing 40 about a substantially vertical axis and coaxially attached to the roller 4 for rotation therewith is an elongated screw spindle 32′ which extends through the tube 22 projecting upwardly from the housing 40. The upper end of the spindle 32′ is turnably mounted in a ball bearing fixed to the upper end of the tube 22. The screw thread of the screw spindle 32′ engages with a corresponding thread on a nut 33′ which has two opposite projections 39 respectively extending through slots formed in the tube 22 so that upon rotation of the spindle 22′ the nut 33′ will not rotate but move longitudinally along the spindle. A tension coil spring 1′ is fixed at opposite ends thereof to the nut 33 and to the ball bearing at the upper end of the tube 22 and the arrangement is made in such a way that during unwinding of the towing cable 8 from the roller 4 not only the spring 1′ is tensioned but also a spring 27 located between the nut 33′ and the roller 4 is compressed. The lower end of the spring 27 engages a sleeve 34 to which a disc 44 is connected, which in turn abuts against the upper surface of the roller 4. This disc 44 will act therefore as a brake on the roller 4 after the cable 8 has been unwound therefrom to a considerable extent and after the nut 33′ is moved downwardly on the spindle 33 to compress the spring 27. Preferably the sleeve 34 is arranged in the tube 22 movably in axial direction but prevented from rotation about the axis by any means known in the art.

Finally, FIG. 7 shows a further embodiment of the suspension arrangement according to the present invention in which the step-down gear means include a worm 7 coaxially fixed to the roller 4 for rotation therewith, which worm meshes with a worm gear 3′ turnably mounted in the housing 40′. Coaxially fixed to the worm gear 3′ for rotation therewith is a pinion 35 which meshes with rack teeth 36 formed in a rod 37 extending upwardly through the tube 22. A plate fixed to the upper end of the rod 37 engages the upper end of an elongated coil compression spring 1 which abuts with its lower end against a shoulder formed at the lower end of the tube 22, as shown in FIG. 2. The arrangement is made in such a way that during unwinding of the towing cable 8 from the roller 4, the rod 37 is moved downwardly so that the spring 1 is compressed and the unwinding is produced against the increasing force resulting from the compression of the spring 1. A damping spring 31 is again located between the upper closed end of the tube 22 and the plate fixed to the upper end of the rod 37 to dampen the return movement of the spring 1. The tube 22 is again fixed to the traction cable 25.

It will be understood that each of the elements described above, or two or more together, may also find a useful application in other types of suspension arrangements differing from the types described above. It should be mentioned that the various braking or damping arrangements shown in FIG. 5 may be used in connection with any of the embodiments shown in FIGS. 2, 4, 6 or 7. Common to all arrangements is that a considerable change in the free length of the towing cable may be produced with a relatively small spring movement due to the step-down gear transmission between the roller on which the tensioned cable is wound and the elongated spring means. The suspension arrangement will also provide for a shock-free pulling of a skier using the arrangement.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Suspension arrangement for attaching a towing cable to a traction cable of a ski tow or the like comprising, in combination, support means adapted to be attached to the traction cable; a roller turnably mounted in said support means; a towing cable fixed at one end to said roller and wound in part thereon so that during exerting a pull on the other end of said cable and unwinding of said towing cable from said roller to increase the free length of said cable, said roller is rotated in one direction; elongated coil spring means engaging with one end said support means and having another end spaced in axial direction from said one end; and step-down gear transmission means operatively connected to said roller and to said other end of said elongated spring means to translate rotation of said roller in said one direction into change of the spacing between said spring ends over a distance which is only a small fraction of the increase of the free length of said cable to increasingly stress said spring means so that when a pull is exerted on said towing cable it will be unwound from said roller against the force produced by the stressed spring means and so that the latter will rewind the towing cable on said roller after decrease of the pull and whereby a considerable increase of the free length of said towing cable may be produced without unduly stressing said spring means, said step-down gear transmission means including a screw spindle coaxially fixed to said roller for rotation therewith, a nut screwed on said spindle and engaging the other end of said spring means, and means cooperating with said nut for preventing turning of the same during rotation of the spindle.

2. Suspension arrangement for attaching a towing cable to a traction cable of a ski tow or the like comprising, in combination, support means adapted to be attached to the traction cable; a roller turnably mounted in said support means; a towing cable fixed at one end to said roller and wound in part thereon so that during exerting a pull on the other end of said cable and unwinding of said towing cable from said roller to increase the free lengths of said cable, said roller is rotated in one direction; elongated coil spring means engaging with one end said support means and having another end spaced in axial direction from said one end; step-down gear transmission means operatively connected to said roller and to said other end of said elongated spring means to translate rotation of said roller in said one direction into change of the spacing between said spring ends over a distance which is only a small fraction of the increase of the free length of said cable to increasingly stress said spring means so that when a pull is exerted on said towing cable it will be unwound from said roller against the force produced by said stressed spring means and so that the latter will rewind said towing cable on said roller after decrease of the pull, whereby a considerable increase of the free lengths of said towing cable may be produced without unduly stressing said spring means; braking means cooperating with said roller for braking the movement thereof; and actuating means engaging said brake means for applying the same with increasing pressure against said roller after unwinding of the towing cable to a predetermined extent from said roller.

3. Suspension arrangement for attaching a towing cable to a traction cable of a ski tow or the like comprising, in combination, support means adapted to be attached to the traction cable; a roller turnably mounted in said support means; a towing cable fixed at one end to said roller and wound in part thereon so that during exerting a pull on the other end of said cable and unwinding of said towing cable from said roller to increase the free length of said cable, said roller is rotated in one direction; elongated coil spring means engaging with one end said support means and having another end spaced in axial direction from said one end; step-down gear transmission means operatively connected to said roller and to the other end of said elongated spring means to translate rotation of said roller in said one direction into change of the spacing between said spring ends over a distance which is only a small fraction of the increase of the free length of said cable to increasingly stress said spring means so that when a pull is exerted on said towing cable it will be unwound from said roller against the force produced by the stressed spring means and so that the latter will rewind the towing cable on said roller after decrease of the pull and whereby a considerable increase of the free length of said towing cable may be produced without unduly stressing said spring means, said step-down gear transmission means including a screw spindle coaxially fixed to said roller for rotation therewith, a nut screwed on said spindle and engaging the other end of said spring means, and means cooperating with said nut for preventing turning of the same during rotation of the spindle; and brake means cooperating with said step-down gear transmission means for braking the movement thereof and that of the roller connected thereto, said brake means including a braking member located between said roller and said nut and having a surface in contact with said roller and another surface in the path of said nut so that said braking member will be pressed with increasing force against said roller during rotation of the latter in said one direction and after a predetermined length of said towing cable is unwound from said roller.

4. A suspension arrangement as set forth in claim 3, wherein said braking member has a tubular portion turnably mounted on said spindle and a flange portion on one end of said tubular portion and engaging a side face of said roller.

5. A suspension arrangement as set forth in claim 4, and including a compression spring between said nut and the other end of said tubular portion of said braking member.

6. Suspension arrangement for attaching a towing cable to a traction cable of a ski tow or the like comprising, in combination, support means attached to the traction cable; a roller turnably mounted in said support means; a towing cable fixed at one end to said roller and wound in part thereon so that during exerting a pull on the other end of said towing cable and unwinding thereof from said roller to increase the free length of said towing cable, said roller is rotated in one direction; elongated coil spring means engaging with one end said support means and having another end spaced in axial direction from said one end; step-down gear transmission means operatively connected to said roller and to said other end of said elongated spring means to translate rotation of said roller in said one direction into a change of the spacing between said spring ends over a distance which is only a small fraction of the increase of the free length of said towing cable to increasingly stress said spring means so that when a pull is exerted on said towing cable it will be unwound from said roller against the force produced by said stressed spring means and so that the latter will rewind said towing cable on said roller after decrease of the pull, whereby a considerable increase of the free length of the towing cable may be produced without unduly stressing said spring; and braking means operatively connected to said roller for braking the movement thereof after unwinding a predetermined length of said towing cable from said roller.

7. Suspension arrangement for attaching a towing cable to a traction cable of a ski tow or the like comprising, in combination, support means attached to the traction cable; a roller turnably mounted in said support means; a towing cable fixed at one end to said roller and wound in part thereon so that during exerting a pull on the other end of said towing cable and unwinding thereof from said roller to increase the free length of said towing cable, said roller is rotated in one direction; elongated coil spring means engaging with one end said support means and having another end spaced in axial direction from said one end; and step-down transmission means including a first member connected to said roller for rotation therewith about a common axis, and a second member in meshing engagement with said first member and operatively connected to said other end of said elongated spring means to translate rotation of said roller in said one direction into a change of the spacing between said spring ends over a distance which is only a small fraction of the increase of the free length of said towing cable to increasingly stress said spring means so that when a pull is exerted on said towing cable it will be unwound from said roller against the force produced by said stressed spring means and so that the latter will rewind said towing cable on said roller after decrease of the pull, whereby a considerable increase of the free length of the towing cable may be produced without unduly stressing said spring.

References Cited by the Examiner

UNITED STATES PATENTS

| | | | |
|---|---|---|---|
| 2,087,232 | 7/37 | Constam | 104—173 |
| 2,099,240 | 11/37 | Sproul | 104—197 |
| 2,677,331 | 5/54 | Hauseman | 104—112 |

FOREIGN PATENTS

| | | |
|---|---|---|
| 849,755 | 8/35 | France. |
| 1,088,127 | 9/54 | France. |

LEO QUACKENBUSH, *Primary Examiner.*

JAMES S. SHANK, *Examiner.*